(12) United States Patent
Ito et al.

(10) Patent No.: US 10,501,019 B2
(45) Date of Patent: Dec. 10, 2019

(54) LUGGAGE COMPARTMENT STRUCTURE OF VEHICLE

(71) Applicants: TOYOTA BOSHOKU KABUSHIKI KAISHA, Aichi (JP); KABUSHIKI KAISHA TOYOTA JIDOSHOKKI, Aichi (JP); TOYOTA JIDOSHA KABUSHIKI KAISHA, Aichi-ken (JP)

(72) Inventors: Yuki Ito, Aichi-ken (JP); Takafumi Hasegawa, Aichi-ken (JP); Hirokazu Niimi, Aichi-ken (JP)

(73) Assignees: TOYOTA BOSHOKU KABUSHIKI KAISHA, Aichi (JP); KABUSHIKI KAISHA TOYOTA JIDOSHOKKI, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/130,437

(22) Filed: Sep. 13, 2018

(65) Prior Publication Data

US 2019/0084483 A1   Mar. 21, 2019

(30) Foreign Application Priority Data

Sep. 19, 2017  (JP) ................................. 2017-178700

(51) Int. Cl.
  *B60R 5/04*   (2006.01)
  *B60R 16/04*   (2006.01)
  (Continued)

(52) U.S. Cl.
  CPC .............. *B60R 5/04* (2013.01); *B60R 13/011* (2013.01); *B60R 13/013* (2013.01); *B60R 16/04* (2013.01);
  (Continued)

(58) Field of Classification Search
  CPC ... B60R 16/04; B60R 5/04; B60R 2011/0019; B60R 2011/0036; B60R 13/011; B60R 13/013
  (Continued)

(56) References Cited

U.S. PATENT DOCUMENTS 5,951,085 A * 9/1999 Fukatsu .................... B60R 7/02
                                                      296/37.8
6,832,799 B2 * 12/2004 Haspel ...................... B60R 5/04
                                                      224/539
(Continued)

FOREIGN PATENT DOCUMENTS

JP   2013-169849   9/2013

*Primary Examiner* — Gregory A Blankenship
(74) *Attorney, Agent, or Firm* — Greenblum & Bernstein, P.L.C.

(57) ABSTRACT

A luggage compartment structure of a vehicle includes a floor covering, a side trim, and a pocket assembly. The floor covering includes a first board portion disposed closer to a front of the vehicle, a second board portion disposed closer to a rear of the vehicle, and a hinge portion that couples the first board portion with the second board portion. The second board portion is foldable on the hinge portion over the first board portion. The side trim is disposed on a side of the floor covering and includes a wall portion and a floor portion. The pocket assembly is disposed closer to the rear of the vehicle relative to the hinge and attached to the side trim to be detachable. The pocket assembly includes a sidewall portion and a bottom wall portion projecting from a lower edge of the sidewall portion and under which a battery is disposed.

7 Claims, 5 Drawing Sheets

(51) Int. Cl.
*B60R 11/00* (2006.01)
*B60R 13/01* (2006.01)

(52) U.S. Cl.
CPC .............. *B60R 2011/0019* (2013.01); *B60R 2011/0036* (2013.01)

(58) Field of Classification Search
USPC ................................ 296/37.8, 37.14, 37.16
See application file for complete search history.

(56) References Cited

U.S. PATENT DOCUMENTS

| | | | | |
|---|---|---|---|---|
| 7,249,795 | B1* | 7/2007 | Kellerman | A61G 21/00 296/16 |
| 7,794,004 | B2* | 9/2010 | Aebker | B60R 5/04 296/37.8 |
| 2006/0181104 | A1* | 8/2006 | Khan | B60N 2/36 296/37.16 |
| 2009/0001748 | A1* | 1/2009 | Brown | B60R 7/005 296/37.8 |
| 2010/0026031 | A1* | 2/2010 | Jouraku | B60R 5/04 296/37.16 |
| 2010/0052353 | A1* | 3/2010 | Shea | B60H 1/00592 296/37.16 |
| 2011/0248521 | A1* | 10/2011 | Jackson | B60R 5/04 296/37.1 |
| 2016/0039474 | A1* | 2/2016 | Murray | B62D 25/20 296/24.33 |
| 2018/0141510 | A1* | 5/2018 | Toyoda | B60R 16/04 |
| 2019/0084483 | A1* | 3/2019 | Ito | B60R 5/04 |

* cited by examiner

LUGGAGE COMPARTMENT STRUCTURE OF VEHICLE

CROSS REFERENCE TO RELATED APPLICATION

This application claims priority from Japanese Patent Application No. 2017-178700 filed on Sep. 19, 2017. The entire contents of the priority application are incorporated herein by reference.

TECHNICAL FIELD

The present disclosure relates to a luggage compartment structure of a vehicle.

BACKGROUND

A vehicle may include a hybrid vehicle battery or an auxiliary battery under a luggage compartment floor at the rear of the vehicle. To access the battery, a luggage compartment floor covering that forms a portion of the luggage compartment floor needs to be removed.

If the luggage compartment floor covering is a single flat board, the entire luggage compartment floor covering needs to be removed to access the battery. Therefore, articles on the luggage compartment floor covering also need to be removed, that is, the access to the battery requires a lot of work. This may be a problem for starting an engine using booster cables in emergency situations. The luggage compartment floor covering may be configured to be foldable to provide access to the battery in emergency situations. According to the configuration, the battery may be accessible but may not be taken out of a space under the luggage compartment for replacement of the battery.

The battery may be disposed in an area of the vehicle more to the rear of the vehicle than a wheel housing portion and more to the outer side of the vehicle than the luggage compartment floor covering. Even so, easy access to the battery is needed.

SUMMARY

The present invention was made in view of the foregoing circumstances. An object is to provide a luggage compartment structure of a vehicle with easy access to a battery.

A luggage compartment structure of a vehicle under which a space is provided includes a floor covering, a side trim, and a pocket assembly. The floor covering defines a portion of a floor of a luggage compartment that is defined by at least the luggage compartment structure. The floor covering includes a first board portion, a second board portion, and a hinge portion. The first board portion is disposed closer to a front of the vehicle and defines a first portion of the floor of the luggage compartment. The second board portion is disposed closer to a rear of the vehicle and defines a second portion of the floor of the luggage compartment. The hinge portion couples a rear edge of the first board portion with a front edge of the second board portion and on which the second board portion is foldable over the first board portion. The side trim is disposed on a side of the floor covering. The side trim includes a wall portion and a floor portion. The wall portion defines a first portion of a sidewall of the luggage compartment. The floor portion projects from the wall portion to a side edge of the floor covering. The pocket assembly is attached to the side trim to be detachable. The pocket assembly is disposed on a side of the second board portion of the floor covering and closer to the rear of the vehicle relative to the hinge. The pocket assembly includes a bottom wall portion and a sidewall portion. The bottom wall portion is disposed in a horizontal position and a battery is disposed under the bottom wall portion. The sidewall portion projects upward from an edge of the bottom wall portion farther from the floor covering and defines a second portion of the sidewall of the luggage compartment.

According to the configuration, the battery is accessible without removing the entire floor of the luggage compartment. Furthermore, the battery is exposed when the second board portion is folded and the pocket assembly is removed from the side trim. Without a complex procedure that includes removing multiple components, the battery is accessible in emergency situations or easily taken out of the space under the floor of the luggage compartment. The access to the batter or the removal of the batter can be efficiently performed with less steps.

According to the technologies described herein, a luggage compartment structure of a vehicle with easy access to a battery is provided.

DETAILED DESCRIPTION

Figure 1:
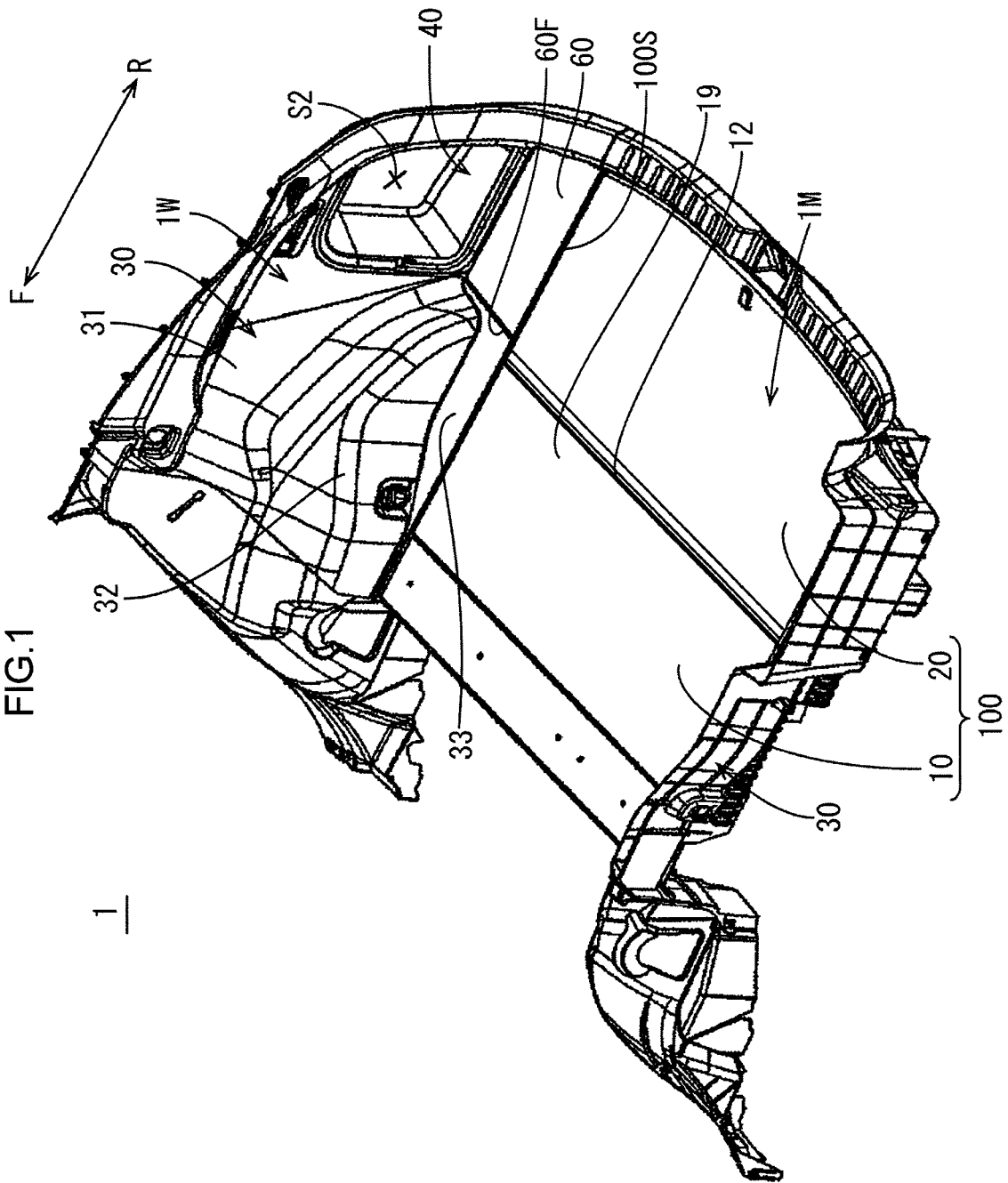
FIG. 1 is a perspective view of a luggage compartment of a vehicle.
Figure 2:
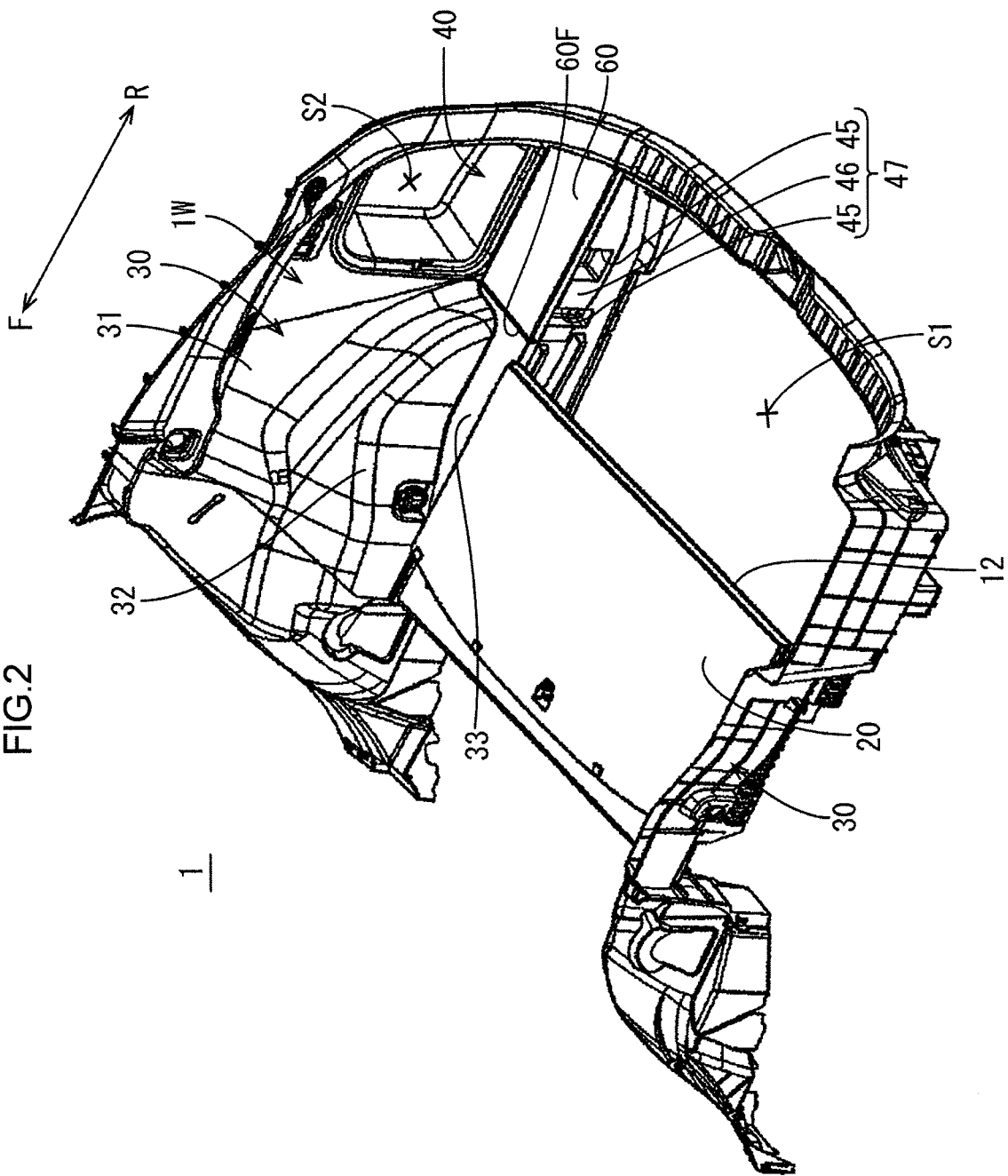
FIG. 2 is a perspective view of the luggage compartment including a luggage compartment floor covering that is folded.
Figure 3:
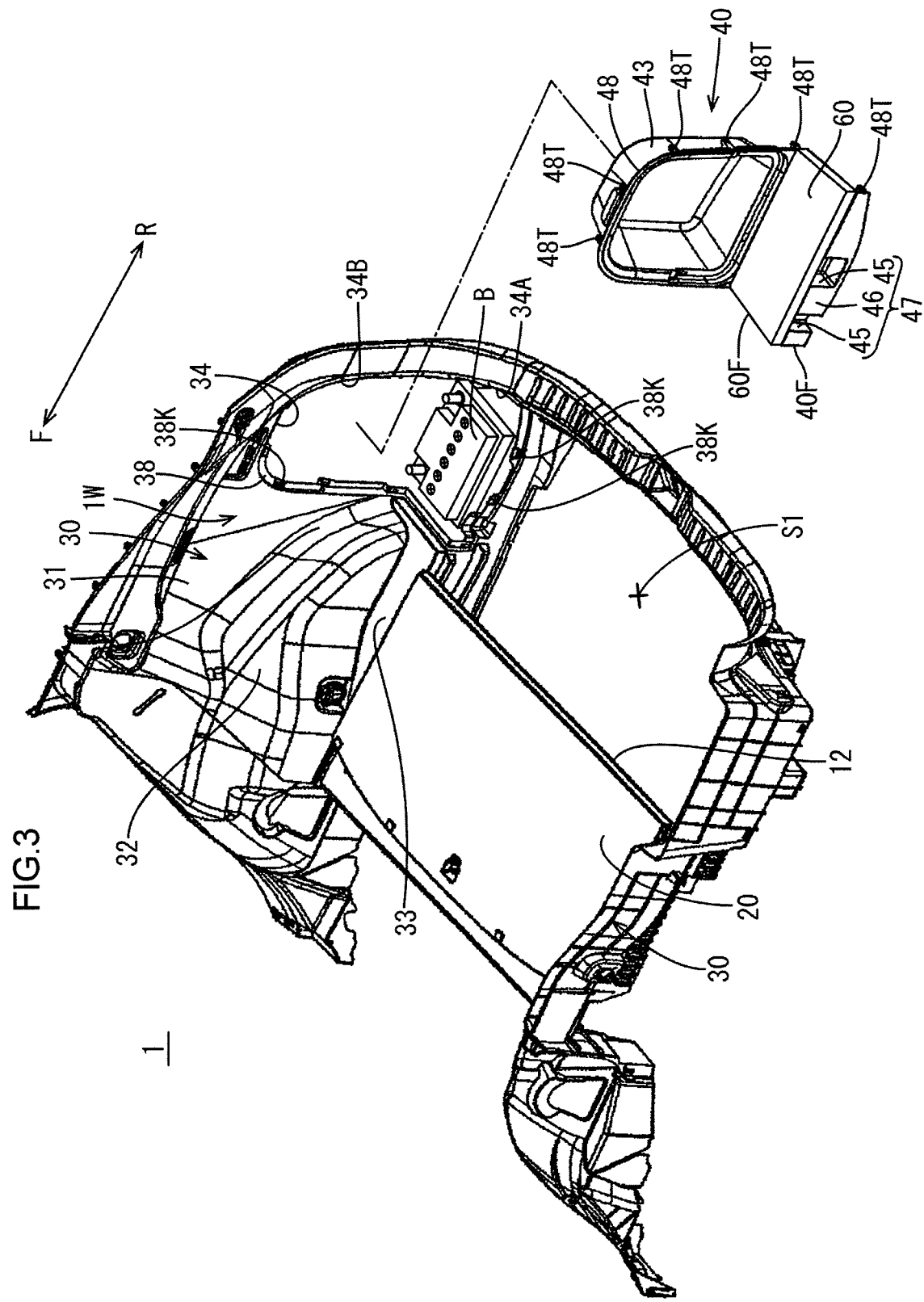
FIG. 3 is a perspective view of the luggage compartment including a side pocket assembly removed from a side board of the luggage compartment.

An embodiment will be described with reference to FIGS. 1 to 5. In FIGS. 1 to 3, letters F and R indicate front and rear of a vehicle, respectively. A luggage compartment illustrated in FIG. 1 is accessible from the rear of the vehicle. The luggage compartment is defined by at least a luggage compartment structure 1 that includes a luggage compartment floor covering 100, luggage compartment side trims 30, and a side pocket assembly 40. The luggage compartment floor covering 100 defines a portion of a floor 1M of the luggage compartment. The luggage compartment side trims 30 define portions of sidewalls 1W of the luggage compartment. The side pocket assembly 40 is disposed a side of the luggage compartment floor covering 100 and fitted in one of the luggage compartment side trims 30. The side pocket assembly 40 is detachable from the luggage compartment side trim 30. The side pocket assembly 40 defines another portion of the floor 1M of the luggage compartment and a portion of the sidewall 1W of the luggage compartment.

The luggage compartment floor covering 100 is placed in a horizontal position. The luggage compartment floor covering 100 includes a plate surface on which articles can be placed. The luggage compartment floor covering 100 includes a first side edge 100S and a second side edge 100S that are linear edges extending in the front-rear direction of the vehicle and separated from each other in the width direction of the vehicle. Under the luggage compartment floor covering 100, a storage S1 is provided for storing a spare tire, tools, or any other articles (see FIG. 2). The luggage compartment floor covering 100 is fordable to access the storage S1. The luggage compartment floor covering 100 includes a first board portion 10, a second board portion 20, and a hinge portion 12. The first board portion 10 is located closer to the front of the vehicle. The first board portion 10 defines a first portion of the floor 1M of the luggage compartment. The second board portion 20 is located closer to the rear of the vehicle. The second board portion 20 defines a second portion of the floor 1M of the luggage compartment. The hinge portion 12 is between the first board portion 10 and the second board portion 20. The hinge portion 12 couples the rear edge 19 of the first board portion 10 with the front edge of the second board portion 20. As illustrated in FIG. 2, the second board portion 20 can be folded on the hinge portion 12 over the first board portion 10. The hinge portion 12 is located closer to the front of the vehicle relative to the front edge 40F of the side pocket assembly 40 (a front edge of a bottom wall covering portion 60, which will be described later).

One of the sidewalls 1W of the luggage compartment on the right side of the vehicle will be described. The luggage compartment side trim 30 on the right side of the vehicle will be referred to as a right side trim 30 hereinafter. The right side trim 30 includes a wall portion 31, a wheel housing portion 32, and a floor portion 33. The wall portion 31 has a panel shape along a vehicle body panel and defines a first portion of the sidewall 1W of the luggage compartment. The wheel housing portion 32 bulges from the wall portion 31 toward an interior of the luggage compartment. The floor portion 33 extends from a lower edge of the wheel housing portion 32 in the horizontal direction. The floor portion 33 is flush with the luggage compartment floor covering 100 that defines the portion of the floor 1M of the luggage compartment, that is, the floor portion 33 defines another portion of the floor 1M of the luggage compartment and thus articles can be placed on the floor portion 33.

The side pocket assembly 40 is disposed closer to the rear of the vehicle relative to the wheel housing portion 32 of the right side trim 30. A battery B is disposed under the side pocket assembly 40, namely, under the floor 1M of the luggage compartment (see FIG. 3). The side pocket assembly 40 functions as a battery cover to cover the battery B. The side pocket assembly 40 includes a bottom wall portion 41, a sidewall portion 43, and the bottom wall covering portion 60. The bottom wall portion 41 is disposed in a horizontal position. The sidewall portion 43 projects upward from an exterior edge 42 of the bottom wall portion 41 located closer to the vehicle body panel and defines a portion of the sidewall 1W of the luggage compartment on the right side. The sidewall portion 43 defines a second portion of the sidewall 1W of the luggage compartment. The bottom wall portion 41 and the sidewall portion 43 are substantially perpendicular to each other to form a three-dimensional shape with a substantially L shape when viewed from a side. The side pocket assembly 40 includes locking projections 48T at a peripheral edge 48. The right side trim 30 includes a side pocket assembly mounting hole 34 and locking holes 38K in an opening edge 38 of the side pocket assembly mounting hole 34. The side pocket assembly 40 is fitted in the side pocket assembly mounting hole 34 and fixed to the right side trim 30 with the locking projections 48T fitted in the locking holes 38K, respectively. More specifically, the side pocket assembly mounting hole 34 includes a first section 34A in the floor portion 33 of the right side trim 30 and a second section 34B in the wall portion 31 of the right side trim 30. The bottom wall portion 41 and the sidewall portion 43 of the side pocket assembly 40 are fitted in the first section 34A and the second section 34B of the side pocket assembly mounting hole 34, respectively. The bottom wall covering portion 60 is attached to the bottom wall portion 41 to be detachable. The bottom wall covering portion 60 is flush with the luggage compartment floor covering 100. Namely, a surface of the bottom wall covering portion 60 defines a third portion of the floor 1M of the luggage compartment on which articles can be placed.

Figure 4:
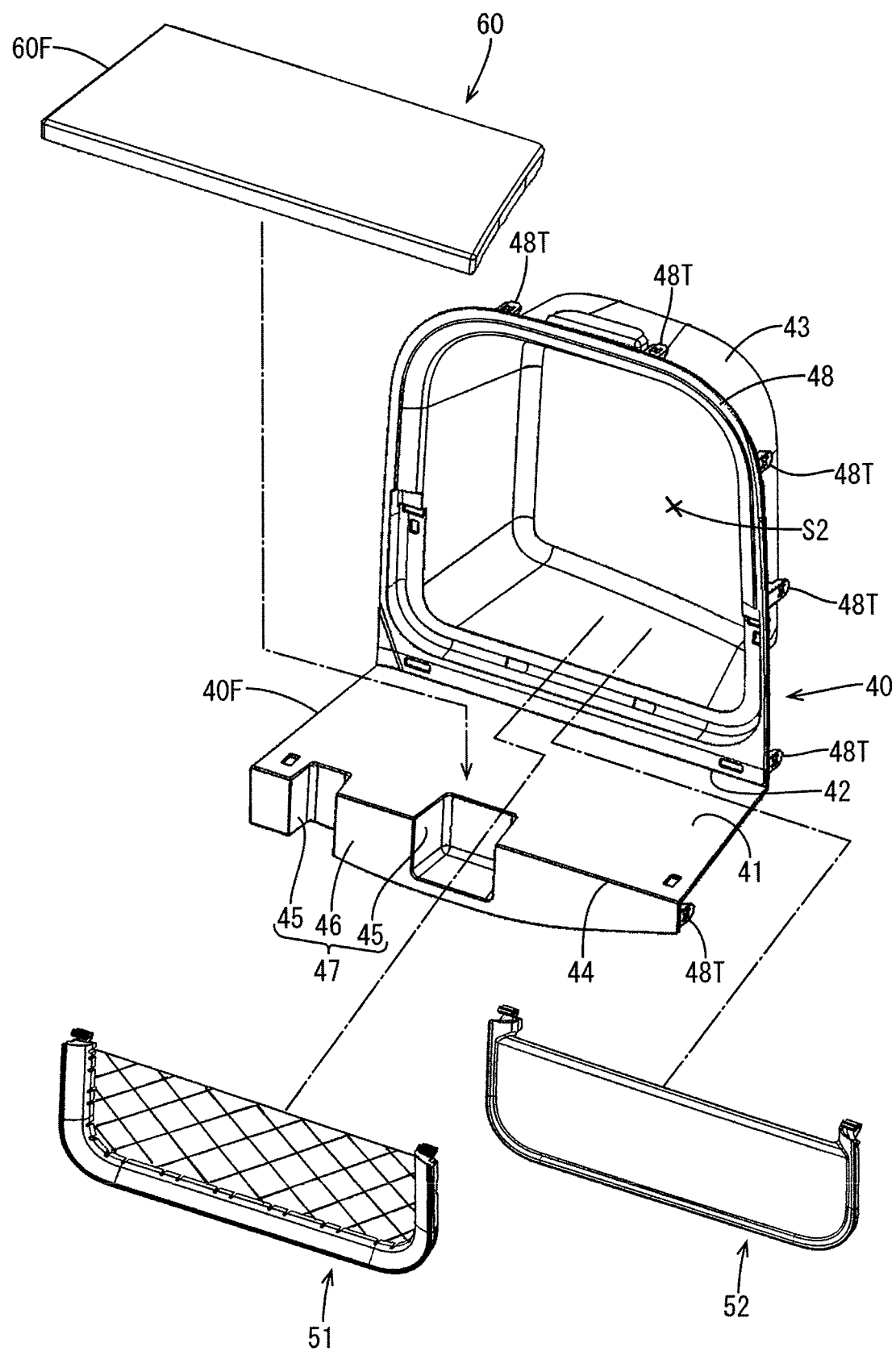
FIG. 4 is an exploded perspective view of the side pocket assembly.
Figure 5:
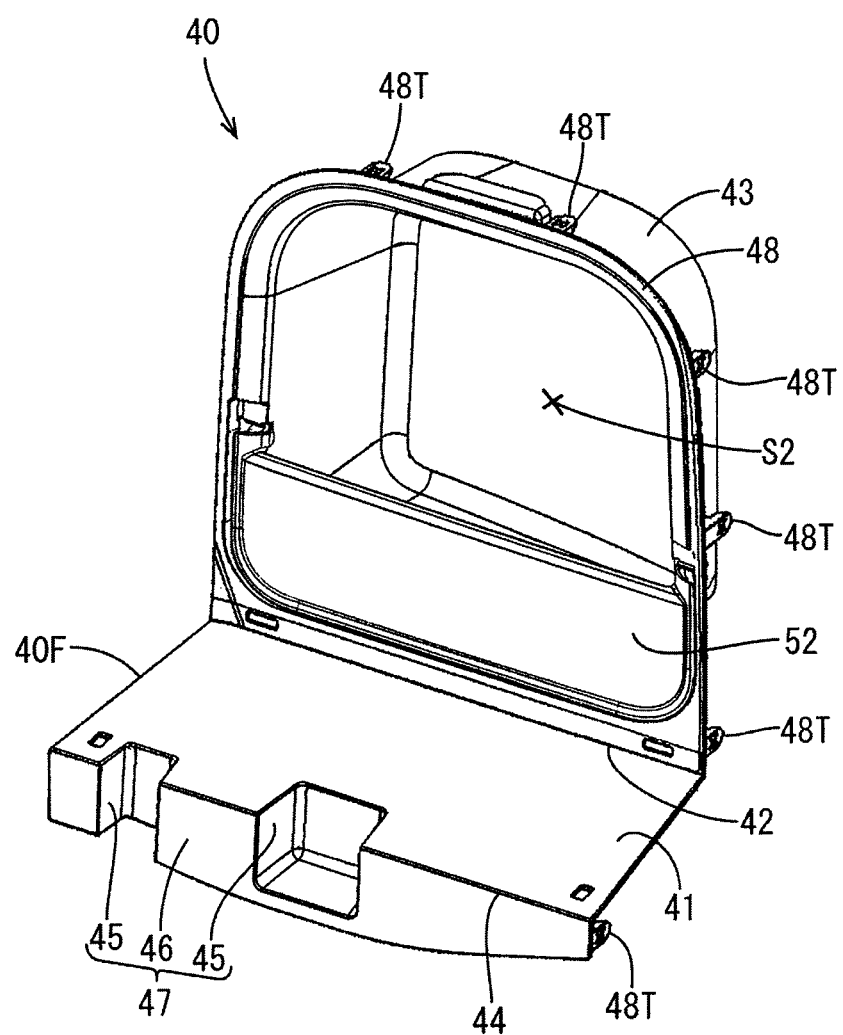
FIG. 5 is a perspective view of the side pocket assembly.

As illustrated in FIG. 4, the bottom wall portion 41 includes recesses 45 that are separated from each other in the front-rear direction. The recesses 45 each include openings in a top surface and a side surface of the bottom wall portion 41. A person may insert his or her fingertips in the recesses 45 to hold a middle portion 46 of the bottom wall portion 41 between the recesses 45 for detachment of the side pocket assembly 40 from the right side trim 30. Namely, the recesses 45 and the middle portion 46 form a holding portion 47 for the detachment of the side pocket assembly 40. The openings of the recesses 45 in the top surface of the bottom wall portion 41 are covered with the bottom wall covering portion 60 and the openings of the recesses 45 in the side surface of the bottom wall portion 41 are hidden by the second board portion 20 of the luggage compartment floor covering 100 when the luggage compartment floor covering 100 is not folded and the first board portion 10 and the second board portion 20 are flush with each other. Because the recesses 45 include the openings in the side surface of the bottom wall portion 41, the person can be insert his or her fingertips in the recesses 45 through the openings in the side surface of the bottom wall portion 41 although the bottom wall portion 41 is covered with the bottom wall covering portion 60 when the second board portion 20 is folded over the first board portion 10.

The side pocket assembly 40 can be detached from the right side trim 30 without removing the bottom wall covering portion 60 from the side pocket assembly 40. Namely, detachment of the side pocket assembly 40 including the bottom wall covering portion 60 can be completed in one step. In comparison to a configuration in which two steps are required to remove a component of a luggage compartment structure, that is, a portion of a luggage compartment floor is removed and then the component of the luggage compartment structure is removed to access a battery, the number of steps can be reduced. The recesses 45 may be used for detachment of the bottom wall covering portion 60 from the bottom wall portion 41.

The sidewall portion 43 of the side pocket assembly 40 is recessed toward the exterior of the vehicle to define a space S2 inside. The space S2 defined by the sidewall portion 43 can be used for storing an elongated member in the luggage compartment structure 1. The sidewall portion 43 may be configured as a container with a holder net 51 or a partition 52 illustrated in FIG. 4. Namely, the side pocket assembly 40 provides a container and a battery cover.

As descried above, the floor portion 33 of the right side trim 30 and the bottom wall covering portion 60 that coves the bottom wall portion 41 of the side pocket assembly 40 are flush with each other to form the portions of the floor 1M of the luggage compartment. The wall portion 31 and the wheel housing portion 32 of the right side trim 30 and the sidewall portion 43 of the side pocket assembly 40 form the portions of the sidewall 1W of the luggage compartment. The battery B is disposed under the floor 1M of the luggage compartment at the position more to the rear of the vehicle relative to the hinge portion 12. Therefore, when the second board portion 20 of the luggage compartment floor covering 100 is folded forward on the hinge portion 12 over the first board portion 10, a person can access to the recesses 45 of the side pocket assembly 40 and detach the side pocket assembly 40 from the right side trim 30 to access the battery B.

According to the structure of the luggage compartment structure 1, the battery B is accessible without completely removing the luggage compartment floor covering 100 but only folding the luggage compartment floor covering 100. Namely, the battery B can be easily and quickly accessible. Furthermore, the battery B can be exposed only by detaching the side pocket assembly 40 from the right side trim 30. The battery B can be easily taken out of the space under the floor 1M of the luggage compartment in emergency situations without a complex procedure that includes removing multiple components. After the second board portion 20 is folded over the first board portion 10, only one step of detaching the side pocket assembly 40 (a single part) is required to access the battery B, that is, the access to or the removal of the battery B requires the less numbers of steps and can be efficiently performed.

When the luggage compartment floor covering 100 is not folded and the first board portion 10 and the second board portion 20 are flush with each other, the openings of the recesses 45 in the side surface of the bottom wall portion 41 are hidden by the second board portion 20. Namely, the holding portion for the detachment of the side pocket assembly 40 is not recognizable unless the second board portion 20 is lifted. Although the recesses 45, which form the holding portion, contributes to the easy access to the battery B, the recesses 45 do not reduce quality of appearance of the luggage compartment.

In a vehicle in which a battery is disposed closer to a sidewall of a luggage compartment under a floor of the luggage compartment, a person who tries to access the battery may be required to take an uncomfortable body position and thus may not easily remove the battery. The luggage compartment structure 1 includes the side pocket assembly mounting hole 34 formed in the side wall portion 31 and the floor portion 33 of the right side trim 30 provided in a relatively large side. Therefore, the battery B can be easily taken out of the space under the floor 1M of the luggage compartment.

The invention claimed is:

1. A luggage compartment structure of a vehicle under which a space is provided, the luggage compartment structure comprising:
   a floor covering defining a portion of a floor of a luggage compartment defined by at least the luggage compartment structure, the floor covering comprising:
      a first board portion disposed closer to a front of the vehicle and defining a first portion of the floor of the luggage compartment;
      a second board portion disposed closer to a rear of the vehicle and defining a second portion of the floor of the luggage compartment; and
      a hinge portion coupling a rear edge of the first board portion with a front edge of the second board portion and on which the second board portion is foldable over the first board portion;
   a side trim disposed on a side of the floor covering, the side trim comprising:
      a wall portion defining a first portion of a sidewall of the luggage compartment; and
      a floor portion projecting from the wall portion to a side edge of the floor covering; and
   a pocket assembly attached to the side trim to be detachable, wherein
   the pocket assembly is disposed on a side of the second board portion of the floor covering and closer to the rear of the vehicle relative to the hinge, and
   the pocket assembly comprises a bottom wall portion disposed in a horizontal position and under which a battery is disposed and a sidewall portion projecting upward from an edge of the bottom wall portion farther from the floor covering and defining a second portion of the sidewall of the luggage compartment.

2. The luggage compartment structure according to claim 1, wherein
   the bottom wall portion of the pocket assembly includes a holding portion composed of recesses and a middle portion between the recesses for detachment of the pocket assembly from the side trim, and
   the holding portion is hidden by the second board portion that is unfolded and flush with the first board portion.

3. The luggage compartment structure according to claim 1, wherein the bottom wall portion and the sidewall portion of the pocket assembly are substantially perpendicular to each other.

4. The luggage compartment structure according to claim 3, wherein
   the side trim includes a pocket assembly mounting hole includes a first section in the floor portion of the side trim and a second section in the wall portion of the side trim,
   the bottom wall portion of the pocket assembly is fitted in the first section of the pocket assembly mounting hole, and
   the sidewall wall portion of the pocket assembly is fitted in the second section of the pocket assembly mounting hole.

5. The luggage compartment structure according to claim 1, wherein the pocket assembly further comprises a covering portion disposed on the bottom wall portion of the pocket assembly to be flush with the second board portion and to define a third portion of the floor of the luggage compartment.

6. The luggage compartment structure according to claim 5, wherein
   the recesses are located under the covering portion, and
   the recesses include openings at least in a side surface of the bottom wall portion closer to the second wall portion of the floor covering.

7. The luggage compartment structure according to claim 5, wherein the covering portion is detachable from the bottom wall portion.

* * * * *